Dec. 30, 1941.  T. B. McCARTHY  2,268,259
VEHICLE DIRECTION INDICATOR OPERATING MEANS
Filed Dec. 21, 1939   3 Sheets-Sheet 1

INVENTOR.
TIMOTHY B. McCARTHY
BY
*Bodell and Thompson*
ATTORNEYS.

Dec. 30, 1941.   T. B. McCARTHY   2,268,259
VEHICLE DIRECTION INDICATOR OPERATING MEANS
Filed Dec. 21, 1939   3 Sheets-Sheet 2

INVENTOR.
TIMOTHY B. McCARTHY
BY
Bodell and Thompson
ATTORNEYS.

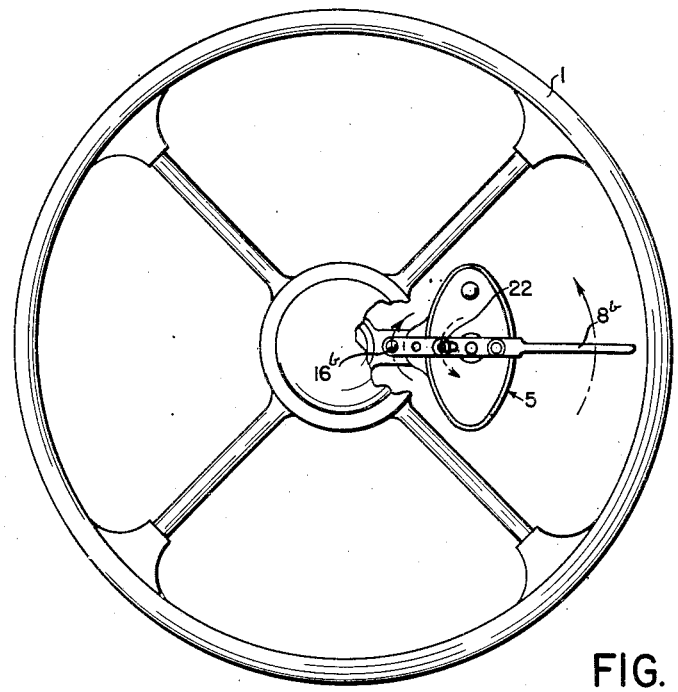
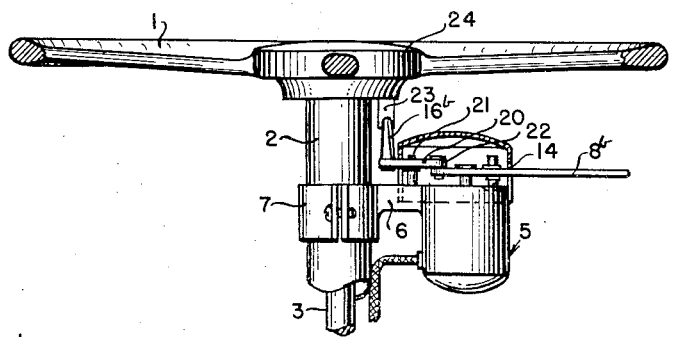
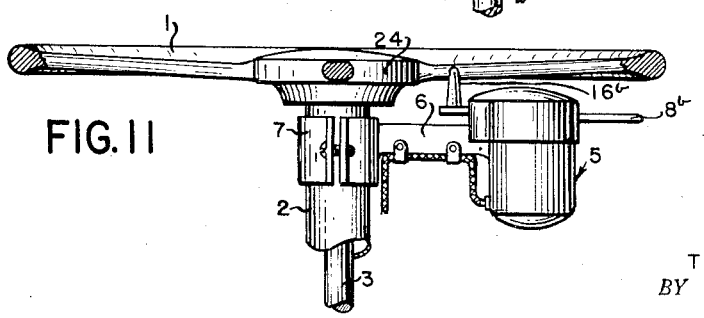
INVENTOR.
TIMOTHY B. McCARTHY

Patented Dec. 30, 1941

2,268,259

UNITED STATES PATENT OFFICE 2,268,259

VEHICLE DIRECTION INDICATOR OPERATING MEANS

Timothy B. McCarthy, Syracuse, N. Y., assignor to Protectall Motor Signal, Inc., Syracuse, N. Y., a corporation of New York Application December 21, 1939, Serial No. 310,311

2 Claims. (Cl. 200—59)

This invention relates to operating switches for direction indicators for motor vehicles in which an operating element or lever is shifted in opposite directions from neutral position to set the signals to indicate a right or left turn, with a means on the hand steering wheel of the vehicle or rotatable with the steering wheel to reset the operating element and the signals upon retrograde turning of the wheel to straight position, after the turn is made, the steering wheel being ineffective on the operating element to shift it when the operating element is in central or neutral position.

It has for its object a resetting member consisting of a finger of resilient compressible material, as rubber, and carried either by the operating lever of the switch or by an element or elements on the steering wheel, as the spokes thereof, the operating lever being held or seated more firmly in central position than in operated position, the finger being of sufficient flexibility to yield or ratchet upon turning of the steering wheel without shifting the switch lever out of central position and also to ratchet when the operating lever is set in one direction or the other out of its neutral position, and the steering wheel turned in that direction, but of sufficient rigidity to dislodge the switch lever out of its operated position and return it to central position, upon retrograde or straightening up movement of the steering wheel.

The invention further has for its object a particularly simple and efficient means for holding the switch in central position with sufficient force to prevent dislodgment thereof by the turning operation of the steering wheel.

The invention consists in the novel features and in the combinations and constructions hereinafter set forth and claimed.

In describing this invention, reference is had to the accompanying drawings in which like characters designate corresponding parts in all the views.

Figures 9, 10 and 11 are views similar to Figures 1, 2 and 3, showing the finger as carried by a lever forming an inward extension of the switch lever and coacting with lugs on the hub of the steering wheel instead of carried by the switch lever and coacting with spokes of the wheel.

Figure 1:
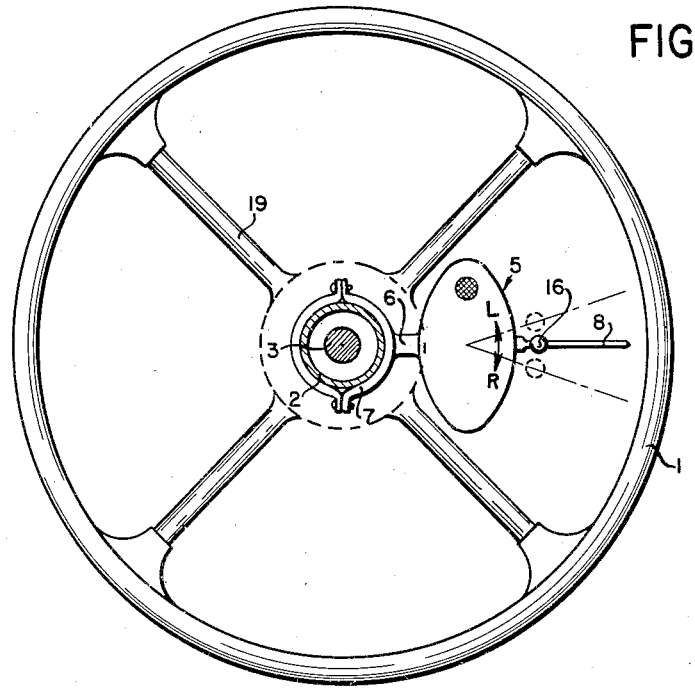
Figure 1 is a plan view, partly in section, of a steering wheel and its column, and the switch applied thereto.

1 designates the steering wheel of a motor vehicle; 2 the column on the upper end of which the steering wheel is rotatably mounted, and 3 the shaft to which the steering wheel is connected, this shaft being rotatable with the wheel and connected to the ground steering wheels of the vehicle through any well-known mechanism. 4 designates the switch which may be of any suitable form, size and construction. It is shown as mounted in a casing 5 having a radially extending bracket 6, which is secured to the steering column 2 directly under the steering wheel in any well-known manner, as by a split clamp 7.

8 designates the operating lever of the switch, this being mounted upon the rotatable shaft 9 of the switch mechanism. The switch lever 8 is movable in opposite directions from neutral position to set the signals to indicate a right or a left turn. It is normally held from dislodgment out of central or neutral position, here shown, as by spring-pressed elements, as poppets or balls 10 suitably mounted in cages or casings 11 here shown as carried by the operating lever 8 on opposite sides of the shaft or axis 9 and coacting with sockets 12 in a bearing plate 13 rigid with the body of the switch 4. These sockets have cam sides coacting with the balls 10. The bearing plate is here shown as discoidal. The lever extends through a slot 14 in the switch casing, the opposite end walls of which form stops which limit the movement of the switch in a clockwise or anti-clockwise direction from central position. During the movement of the switch lever 8 in one direction or the other from central or neutral position, the balls 10 are cammed out of their sockets 12 and ride on the flat face of the disk or bearing plate 13. The springs 15 acting on the balls are of sufficient strength to hold the balls in the sockets, and hence hold the switch lever in central or neutral position against displacement by the finger to be presently described, when the steering wheel is being turned and the signal is not set.

Figure 2:
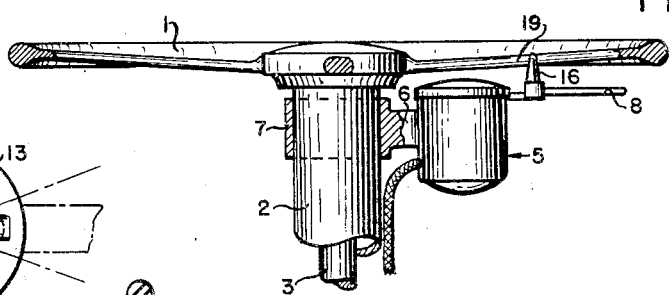
Figure 2 is a transverse sectional view of parts seen in Figure 1.
Figure 4:
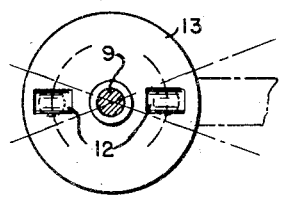
Figure 4 is a sectional view on line 4—4, Figure 3.
Figure 3:
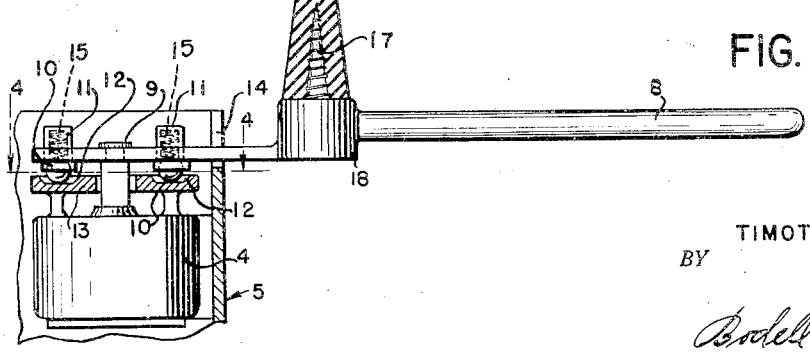
Figure 3 is an enlarged fragmentary elevation of the switch and the operating member showing the finger of flexible resilient material in section.

The resetting finger is shown in Figures 1, 2 and 3, as carried by the operating lever, and in Figures 5, 6, 7 and 8, as carried by and movable with the steering wheel or radially extending elements thereof. Usually the spokes of the steering wheel are utilized as the elements. Hence, the finger is carried either by a radially extending element of the switch, as the operating lever which extends substantially radially, or by a radially extending element on the steering wheel, as one or more of the spokes. In either case, it is carried by an element and extends into the path of the other element.

Figure 5:
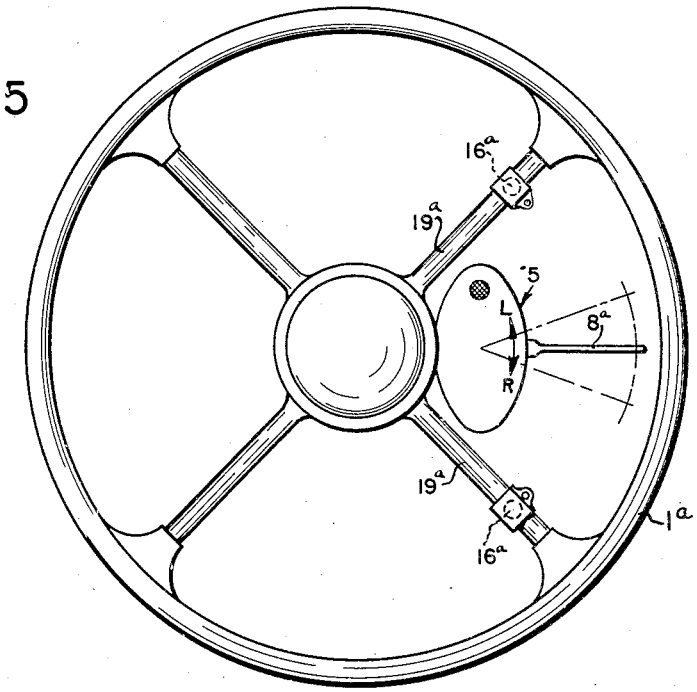
Figures 5 and 6 are views similar to Figures 1 and 2 of a modification of the invention in which the finger or fingers is carried by the steering wheel instead of by the switch operating lever.

In Figure 5, two fingers are shown provided on the steering wheel and normally located on opposite sides of, that is, in front of and behind, the switch, in order that one or the other of the fingers will act to return the switch operating lever to central position, that is, one or the other of the fingers will engage or reset the fingers, regardless of the direction of the turn, and the amount the steering wheel is turned. In Figures 9, 10 and 11, the finger is shown as carried by an extension of the switch operating lever and as coacting with shoulders or lugs on the steering wheel.

16 (Figures 1, 2 and 3) designates the finger which might be called the resetting or knock-off finger. It is formed of rubber and is preferably tapered or conical in form. In Figure 3, it is shown as extending upwardly from the operating lever 8 and as secured thereto by a tapered screw 17 extending through a base or hub 18 formed on the lever 8, axially into the finger, but terminating considerably short of the upper end of the finger, leaving the upper end portion flexible. The finger extends into the path of movement of radial elements or spokes 19 of the steering wheel 1. When the operating lever 8 is in central position, the spring-pressed balls 10 are in the sockets 12 and the finger is of such flexibility as to yield and permit the spokes 19 to ratchet past the finger 16 when the steering wheel is turned and the operating lever 8 is in central position, and hence, the spring-pressed balls located in the sockets 12. When, however, the lever 8 is operated in a clockwise or anti-clockwise direction from neutral to set the signals to indicate a right turn or a left turn, the balls 15 press on the flat surface of the bearing plate 13. When the operating member is so shifted in one direction or the other from neutral, indicating a right or a left turn, the lever engages one end wall or the other of the slot 14. The lever is preferably arranged, so that when a left turn is to be made, the lever is moved in an anti-clockwise direction from neutral, and when a right turn is to be made, the lever is moved in a clockwise direction from neutral. In other words, the lever is operated in the same direction that the steering wheel is to be turned. When so operated and the wheel is turned, the spokes 19 will flex the finger 16 and ratchet past it, as the lever is now stopped in its operated position by one end wall or the other of the slot 14. However, after the turn is made and the steering wheel returned to straight position, the first spoke 19 will engage the finger and return the switch to central position, as the finger is of greater rigidity than the resistance of the balls 10 on the bearing plate 13. When, however, the balls reenter the sockets 12, the resistance offered thereby to the turning of the switch is greater than the resistance offered by the finger to the spokes 19.

Figure 6:
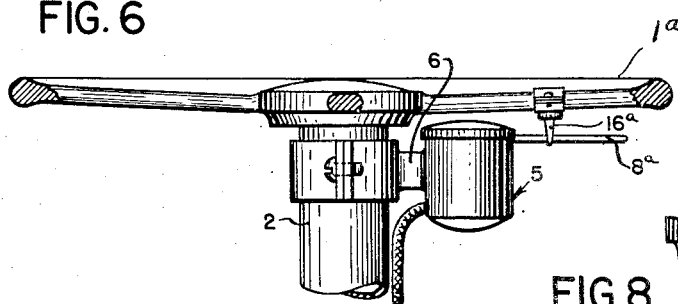
Figure 7:
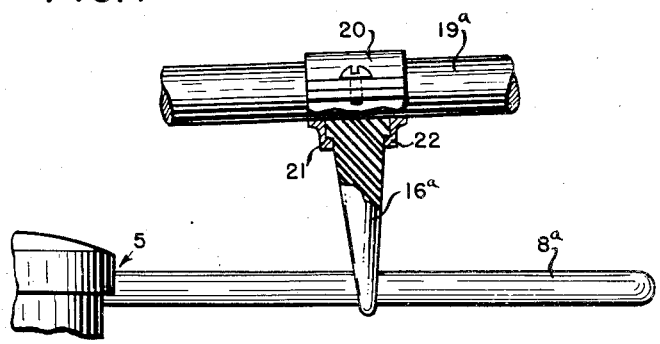
Figure 7 is a view similar to Figure 3 showing the mounting of the finger on one of the spokes of the steering wheel, and also illustrating a modified form of finger from that shown in Figure 3.
Figure 8:
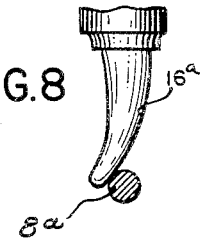
Figure 8 is a detail operation view illustrating the flexing action of the finger.

In Figures 5, 6 and 7, the finger 16$^a$ is shown as carried by the radial elements or spokes 19$^a$ of the steering wheel 1$^a$, they being here shown as carried by a suitable clamp 20 applied to the spokes 19$^a$. The clamp is here shown as a split clamp, and one section thereof is provided with a socket 21 in which the base of the conical finger is seated and interlocked, as at 22. Preferably, there is a finger 16$^a$ on two radial elements or spokes which are located on opposite sides of the switch and its operating member 8$^a$, when the steering wheel is in straight position, two fingers being used in order that one spoke will always pass over the lever 8$^a$ when the wheel is turned in a retrograde direction, after a turn is made, regardless of the angle of the turn.

In Figures 9, 10 and 11, the finger 16$^b$ is shown as carried close to the steering column by an inward extension of the switch operatnig lever 8$^b$, this extension being here shown as a link or lever 20 pivoted between its ends at 21 and one arm thereof being pivoted as by a pin-and-slot connection at 22 to an arm of the lever 8$^b$ extending radially inward beyond the axis of the lever, and the other arm of the link or lever 21 carrying the finger 16$^b$. The finger 16$^b$ may coact with one or more knock-off shoulders or lugs 23 depending from the hub 24 of the steering wheel or may coact with the inner ends of the spokes of the steering wheel, as shown in Figure 11. The lever 20 being pivoted between its ends reverses the movement of the operating lever 8$^b$, so that the finger 16$^b$ is set forwardly anti-clockwise, when the switch operating member or lever is moved anti-clockwise from central position, and rearwardly or clockwise when the operating lever is moved in a clockwise direction.

In the operation of any form, upon the turning of the switch operating lever 8, the finger 16 is correspondingly shifted out of normal or central position, and during the turning of the steering wheel, the finger flexes, permitting the steering wheel to ratchet while it is being turned from straight position to make a right or left turn, and during retrograde movement of the wheel back to straight position, the finger is of sufficient resiliency to offer enough resistance to the spoke or knock-off device on the steering wheel to reset the switch operating lever to central position. When in central position, the operating lever is seated with sufficient firmness to overcome any tendency of the operating lever to be shifted during flexing of the finger when the steering wheel is turned, and the operating lever has not been shifted by hand out of central position.

What I claim is:

1. The combination with a steering mechanism of a motor vehicle including a hand steering wheel having a radially located element movable therewith; of a direction indicator switch mounted below the steering wheel and including an operating lever movable in opposite directions from central position in a plane substantially parallel to the plane of movement of the wheel, the operating lever having an arm extending radially inward beyond its pivot, a motion reversing lever element pivoted between its ends and extending radially inward beyond the inner end of the operating lever, one arm of said lever element being pivotally connected to the inwardly extending arm of the operating lever, a flexible finger carried by and movable with the other arm of said lever element and extending into the path of said radially extending element on the steering wheel.

2. The combination with a steering mechanism of a motor vehicle including a hand steering wheel having a radially located element movable therewith; of a direction indicator switch mounted below the steering wheel and including an operating lever movable in opposite directions from central position in a plane substantially parallel to the plane of movement of the wheel, the operating lever having an arm extending radially inward beyond its pivot, a motion reversing lever element pivoted between its ends and extending radially inward beyond the inner end of the operating lever, one arm of said lever element being pivotally connected to the inwardly extending arm of the operating lever, a flexible finger carried by and movable with the other arm of said lever element and extending into the path of said radially extending element on the steering wheel, the switch including means for holding the operating lever from displacement from its central position by said finger when the wheel is turned, and said finger being of sufficient flexibility to permit relative ratcheting movement of the finger and the element with which it coacts when the operating lever is in one of its operated positions, and the wheel is turned in a direction corresponding to the shifting from central position of said operating lever and of sufficient rigidity to permit the element on the steering wheel to dislodge the operating lever from its shifted position and return it to its neutral position when the wheel is turned in a retrograde direction.

TIMOTHY B. McCARTHY.